United States Patent
Hosonuma

(10) Patent No.: US 6,985,760 B2
(45) Date of Patent: Jan. 10, 2006

(54) FOLDABLE PORTABLE RADIO TERMINAL

(75) Inventor: Yoshimasa Hosonuma, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 09/866,973

(22) Filed: May 29, 2001

(65) Prior Publication Data

US 2001/0046880 A1 Nov. 29, 2001

(30) Foreign Application Priority Data

May 29, 2000 (JP) .............................. 2000-157731

(51) Int. Cl.
*H04B 1/38* (2006.01)

(52) U.S. Cl. .............................. 455/575.3; 455/575.5; 455/107; 455/80; 455/81; 455/280; 455/281; 455/282; 343/702; 333/124

(58) Field of Classification Search ............. 455/575.1, 455/575.5, 107, 80, 81, 280, 281, 282, 289; 343/702; 333/124, 17.3

See application file for complete search history.

(56) References Cited

U.S. PATENT DOCUMENTS

| | | | |
|---|---|---|---|
| 5,335,368 A * | 8/1994 | Tamura | 455/575.7 |
| 5,977,917 A * | 11/1999 | Hirose | 343/702 |
| 6,064,341 A * | 5/2000 | Hassemer | 343/702 |
| 6,526,263 B1 * | 2/2003 | Saito | 455/78 |

FOREIGN PATENT DOCUMENTS

| | | |
|---|---|---|
| EP | 518526 A1 * | 12/1992 |
| GB | 0 518 526 A1 | 12/1992 |
| GB | 2 71 887 A | 4/1994 |
| GB | 2 293 276 A | 3/1996 |
| GB | 2 308 746 A | 7/1997 |
| GB | 2 311 903 | 10/1997 |
| JP | S61-206322 | 12/1986 |
| JP | H04-354425 | 12/1992 |
| JP | H05-041627 | 2/1993 |
| JP | H09-172315 | 9/1996 |
| WO | WO 96/37967 * | 11/1996 |

OTHER PUBLICATIONS

Microfilm of application for a Japanese utility model S59-122498 (Japanese laid-open utility model application S61-037629) dated Mar. 8, 1986.

* cited by examiner

Primary Examiner—Lee Nguyen
Assistant Examiner—Sanh Phu
(74) Attorney, Agent, or Firm—Scully, Scott, Murphy & Presser

(57) ABSTRACT

A foldable portable radio terminal is disclosed which normally optimizes an antenna characteristic by an antenna matching circuit even if the body length of the foldable portable radio terminal varies. A folded state detection circuit sends a detection signal to a control section depending upon whether or not the foldable portable radio terminal is folded. An antenna matching circuit is determined so that the antenna characteristic of an antenna is optimized when the foldable portable radio terminal is in a folded state. When the foldable portable radio terminal is unfolded, the control section renders a matching characteristic changeover circuit operative to change over the matching characteristic of the antenna matching circuit so that, even when the foldable portable radio terminal is in an unfolded state, the antenna characteristic by the antenna matching circuit may be optimized.

16 Claims, 9 Drawing Sheets

FOLDABLE PORTABLE RADIO TERMINAL

BACKGROUND OF THE INVENTION

1. Field of the Invention

The present invention relates to a portable radio terminal such as a portable telephone set or a portable information terminal which has a foldable body, and more particularly to a technique for optimization of an antenna characteristic of a foldable portable radio terminal.

2. Description of the Related Art

Various foldable portable radio terminals are conventionally known, and as one of such foldable portable radio terminals, such a foldable portable telephone set as shown in FIGS. 7 and 8 is conventionally known.

Referring to FIGS. 7 and 8, the conventional foldable portable telephone set 20 includes an upper body 21*a* and a lower body 21*b* connected for opening and closing pivotal movement by a hinge mechanism 22, and a telescopic antenna 23 provided on the upper body 21*a*.

In the foldable portable telephone set 20, the upper body 21*a* and the lower body 21*b* can be pivotally folded relative to each other around the hinge mechanism 22. FIG. 7 shows the foldable portable telephone set 20 in an unfolded state while FIG. 8 shows the foldable portable telephone set 20 in a folded state.

Referring to FIG. 7, a display section 25 including a receiver 24 and an LCD is provided on the upper body 21*a*, and a transmitter 26 and a keyboard 27 which is used to input a telephone number and other data are provided on the lower body 21*b*.

FIG. 9 shows an internal structure of the foldable portable telephone set 20.

Referring to FIG. 9, the foldable portable telephone set 20 includes, in addition to the antenna 23, receiver 24, display section 25, transmitter 26 and keyboard 27, a radio section 28 for performing demodulation and other processes for a radio signal received by the antenna 23, a folded state detection circuit 29 for detecting whether or not the foldable portable telephone set is in a folded state and generating a detection signal corresponding to a result of the detection, an LCD driver 30 for driving the display section 25, an antenna matching circuit 32 for determining an antenna characteristic of the antenna 23, and a control section 33 for controlling the receiver 24, transmitter 26, radio section 28 and LCD driver 30.

The foldable portable telephone set 20 operates in the following manner.

A radio signal received by the antenna 23 is subject to demodulation and other processes by the radio section 28 and is issued as a voice signal from the receiver 24 under the control of the control section 33.

On the other hand, upon transmission, voice of a user is sent through the transmitter 26 to the control section 33 and the radio section 28 and is converted into a radio signal by the radio section 28 and then transmitted from the antenna 23.

The foldable portable telephone set 20 described above with reference to FIGS. 7 to 9 adopts a whip antenna for the antenna 23. A helical antenna 23*a* is provided at an upper end of the whip antenna, and in a state wherein the whip antenna is accommodated in the inside of the upper body 21*a*, the helical antenna operates as the antenna 23.

Generally, the antenna characteristic of a helical antenna is influenced much by the length of the housing (body) of a portable telephone set. Accordingly, in the foldable portable telephone set 20 whose housing length is much different depending upon whether it is folded or not folded, an optimum antenna matching circuit suitable for the housing length cannot be selected.

SUMMARY OF THE INVENTION

It is an object of the present invention to provide a foldable portable radio terminal such as a portable telephone set having a body length variable in accordance with a situation of use by which a fixed antenna characteristic can be obtained without being influenced by the body length.

In order to attain the object described above, according to the present invention, there is provided a foldable portable radio terminal, comprising a portable radio terminal body including a first body and a second body connected for pivotal folding movement to each other, an antenna mounted on the first body, an antenna matching circuit for determining an antenna characteristic of the antenna, and a matching characteristic changeover circuit for changing over the characteristic of the antenna matching circuit so that the antenna characteristic when the portable radio terminal body is folded and the antenna characteristic when the portable radio terminal body is not folded are equal to each other.

The foldable portable radio terminal may further comprise a folded state detection circuit for detecting whether or not the portable radio terminal body is folded and issuing a detection signal representative of a result of the detection, and the matching characteristic changeover circuit may change over the characteristic of the antenna matching circuit in response to the detection signal of the folded state detection circuit.

The antenna matching circuit may determine the antenna characteristic in a state wherein the portable radio terminal body is folded or in another state wherein the portable radio terminal body is not folded. In the former case, the matching characteristic changeover circuit changes over the characteristic of the antenna matching circuit so that the antenna characteristic of the antenna matching circuit when the portable radio terminal body is not folded may be equal to the antenna characteristic in the state wherein the portable radio portable body is folded. In the latter case, the matching characteristic changeover circuit changes over the characteristic of the antenna matching circuit so that the characteristic of the antenna matching circuit when the portable radio terminal body is folded may be equal to the antenna characteristic in the state wherein the portable radio terminal body is not folded.

The matching characteristic changeover circuit may be connected to the antenna and supply current so as to cancel high frequency current distributed in the portable radio terminal body in order to eliminate variation of the high frequency current between when the portable radio terminal body is folded and when the portable radio terminal body is not folded.

The matching characteristic changeover circuit may include a first capacitor connected to an antenna feeding point, an inductor connected at an end thereof to the first capacitor and grounded at the other end thereof, and current production means for supplying current to the inductor. The current production means may include a diode for supplying current to a connection point between the first capacitor and the inductor, and a resistor connected in series to the diode. The current production means may further include a second capacitor connected at an end thereof to a connection point between the diode and the resistor and grounded at the other end thereof.

The capacitance value of the first capacitor and the inductance value of the inductor may be determined so that the antenna matching circuit exhibits an optimum antenna characteristic when the portable radio terminal body is folded or when the portable radio terminal body is not folded.

The current production means may apply a voltage to the resistor to turn on the diode to supply current to the inductor when the folded state detection circuit detects that the portable radio terminal body is not folded or when the folded state detection circuit detects that the portable radio terminal body is folded.

The antenna may include a helical antenna having an antenna feeding point at a base portion thereof. The helical antenna may be provided at a tip end of a whip antenna mounted for telescopic movement into and out of the portable radio terminal body, and the base portion of the helical antenna may serve as the antenna feeding point when the whip antenna is accommodated in the portable radio terminal body.

With the foldable portable radio terminal, the following advantages can be anticipated.

First, the matching characteristic of the antenna matching circuit can be changed over in response to a state wherein the foldable portable radio terminal is folded and another state wherein the foldable portable radio terminal is not folded. In other words, the matching characteristic of the antenna matching circuit can be changed in response to a variation of the body length between the state wherein the foldable portable radio terminal is folded and the state wherein the foldable portable radio terminal is not folded. Consequently, an optimum antenna characteristic can always be obtained without being influenced by the body length of the foldable portable radio terminal.

Second, miniaturization of an antenna for use with a foldable portable radio terminal can be anticipated.

Generally, if an antenna is reduced in size, then the variation of the housing length of the foldable portable radio terminal has a significant influence on the antenna characteristic by the antenna matching circuit. Therefore, with regard to a portable telephone set which merely includes a single antenna matching circuit like the conventional foldable portable telephone set described hereinabove, it is very difficult to improve the antenna characteristic for both in a folded state and an unfolded state. In contrast, according to the present invention, since the characteristic of the antenna matching circuit can be optimized for both of the folded state and the unfolded state of the foldable portable radio terminal, the antenna characteristic is not influenced by the housing length which varies depending upon whether the foldable portable telephone set is folded or unfolded. Consequently, the antenna can be miniaturized.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
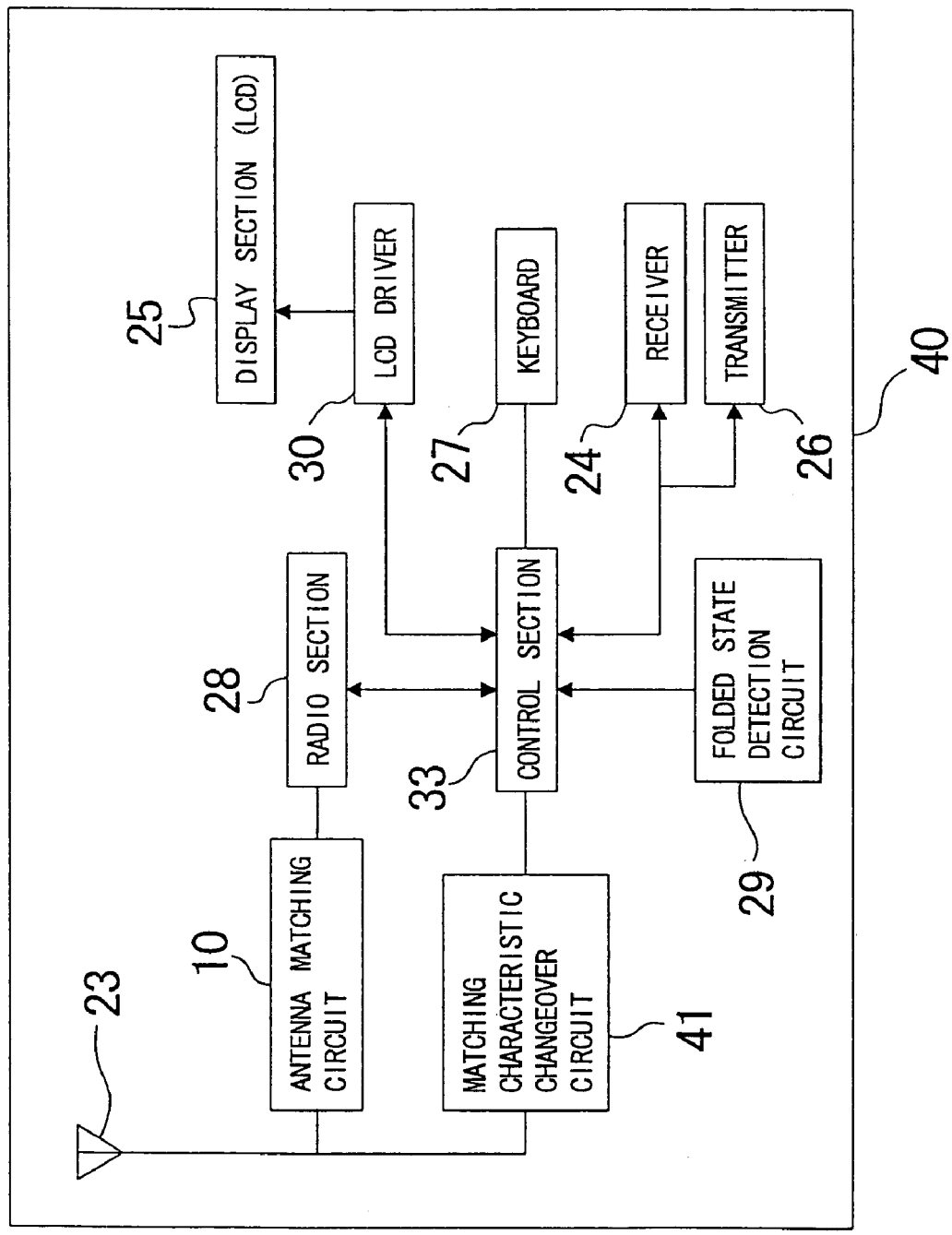
FIG. 1 is a block diagram showing a configuration of a foldable portable telephone set to which the present invention is applied.
Figure 2:
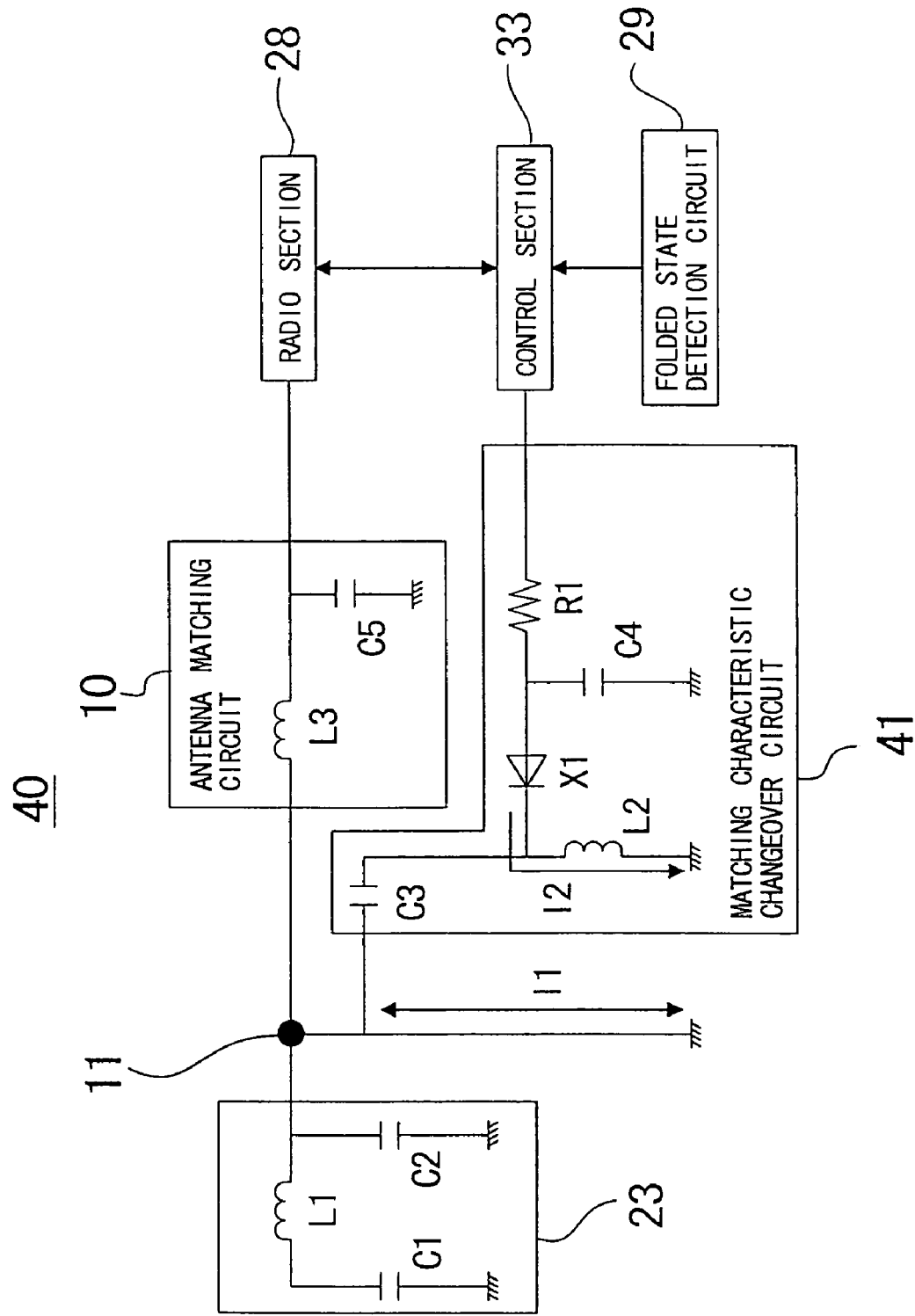
FIG. 2 is a circuit diagram showing an internal configuration of the foldable portable telephone set shown in FIG. 1.
Figure 4:
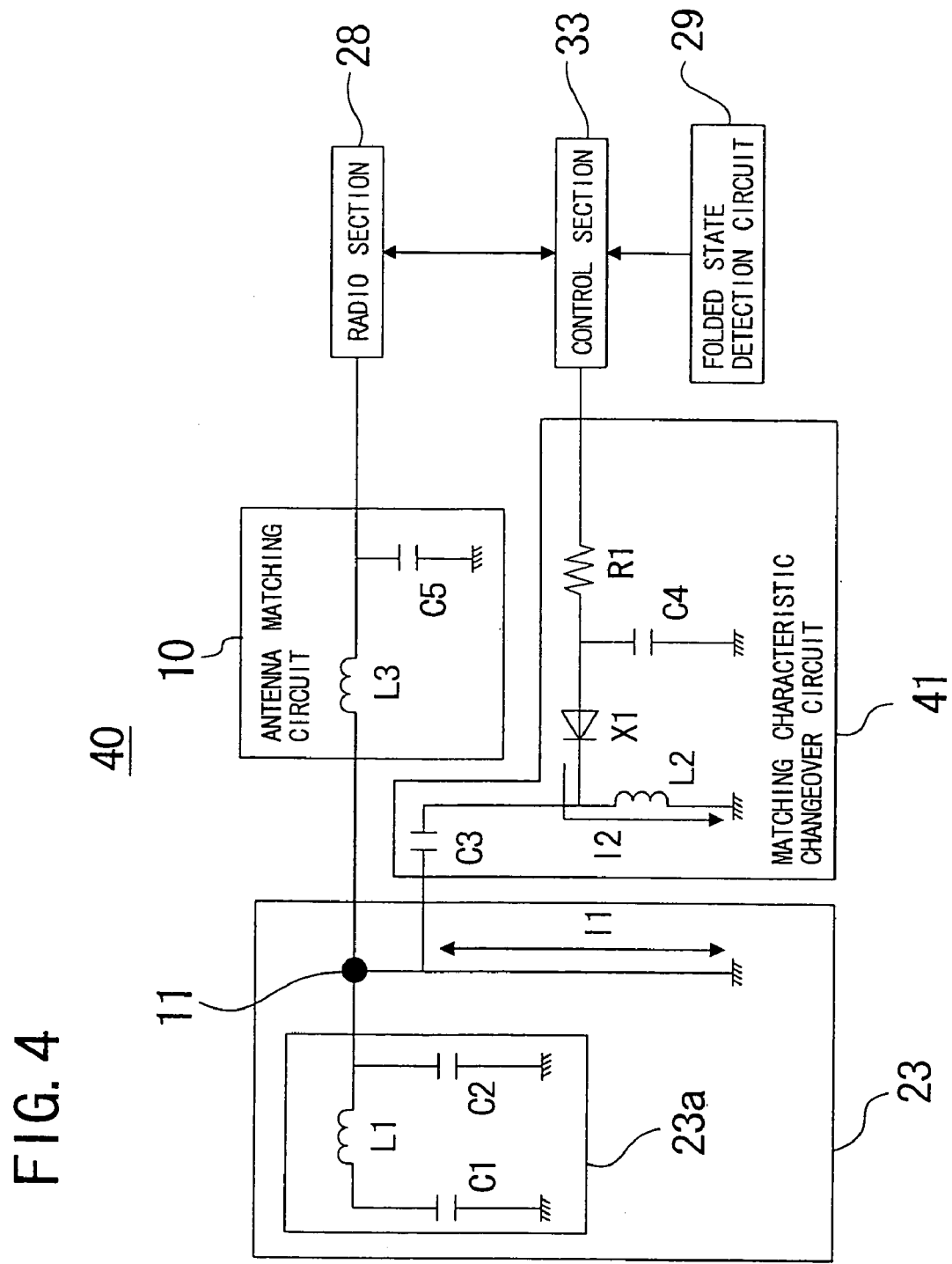
FIG. 4 is a circuit diagram showing an internal configuration of the foldable portable telephone set shown in FIG. 1 when the antenna is accommodated.

In the following, a foldable portable telephone set to which the present invention is applied is described. The foldable portable telephone set according to the present invention is generally denoted by 40 as seen in FIGS. 1, 2 and 4. The foldable portable telephone set 40 has a generally similar configuration to that of the foldable portable telephone set 20 described hereinabove with reference to FIGS. 7 and 8. Therefore, the general configuration of the foldable portable telephone set 40 is described with reference to FIGS. 7 and 8.

The foldable portable telephone set 40 includes an upper body 21a and a lower body 21b connected for pivotal opening and closing movement by a hinge mechanism 22. The upper body 21a has a telescopic antenna 23 provided thereon.

Figure 7:
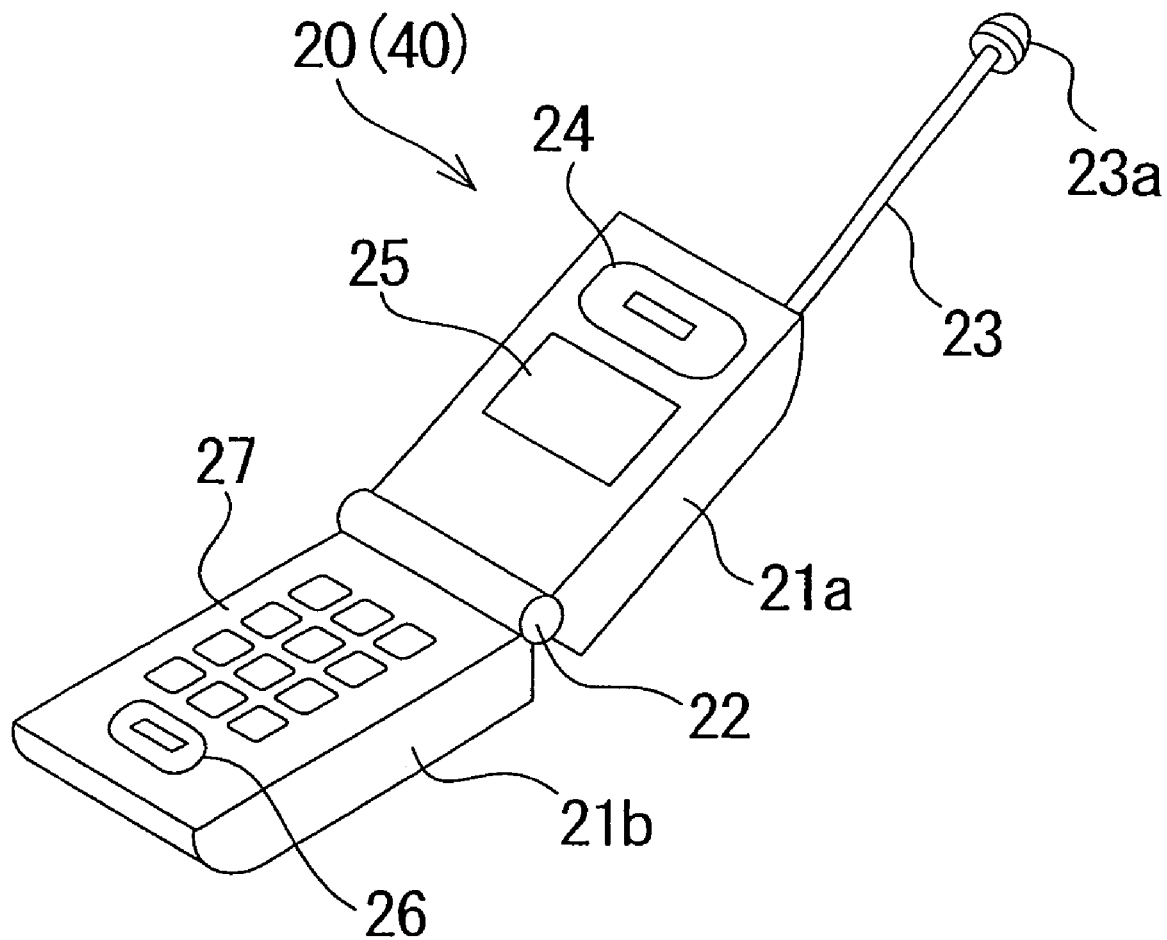
FIG. 7 is a perspective view showing an example of conventional foldable portable telephone set in an unfolded state.
Figure 8:
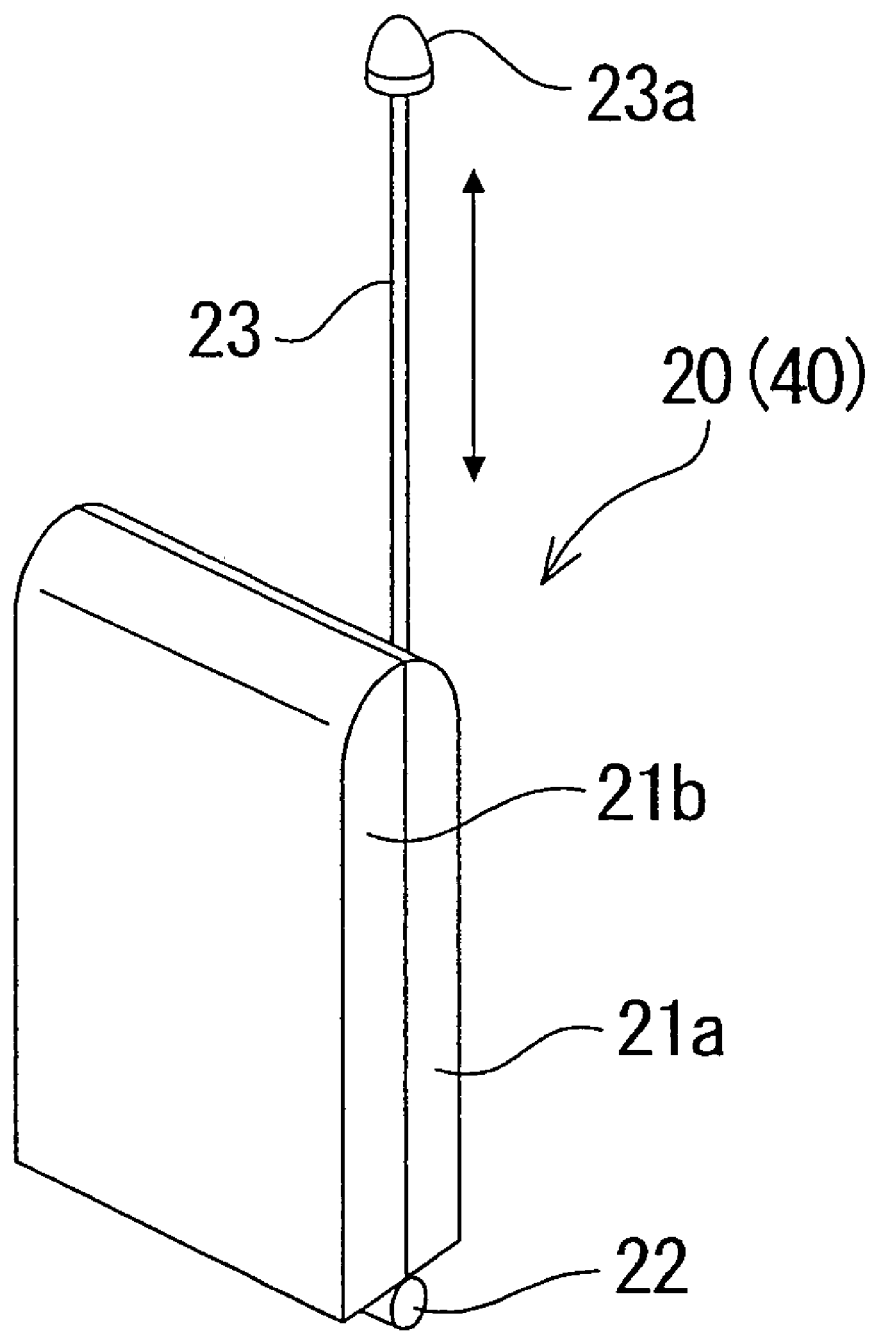
FIG. 8 is a perspective view of the foldable portable telephone set of FIG. 7 in a folded state.
Figure 9:
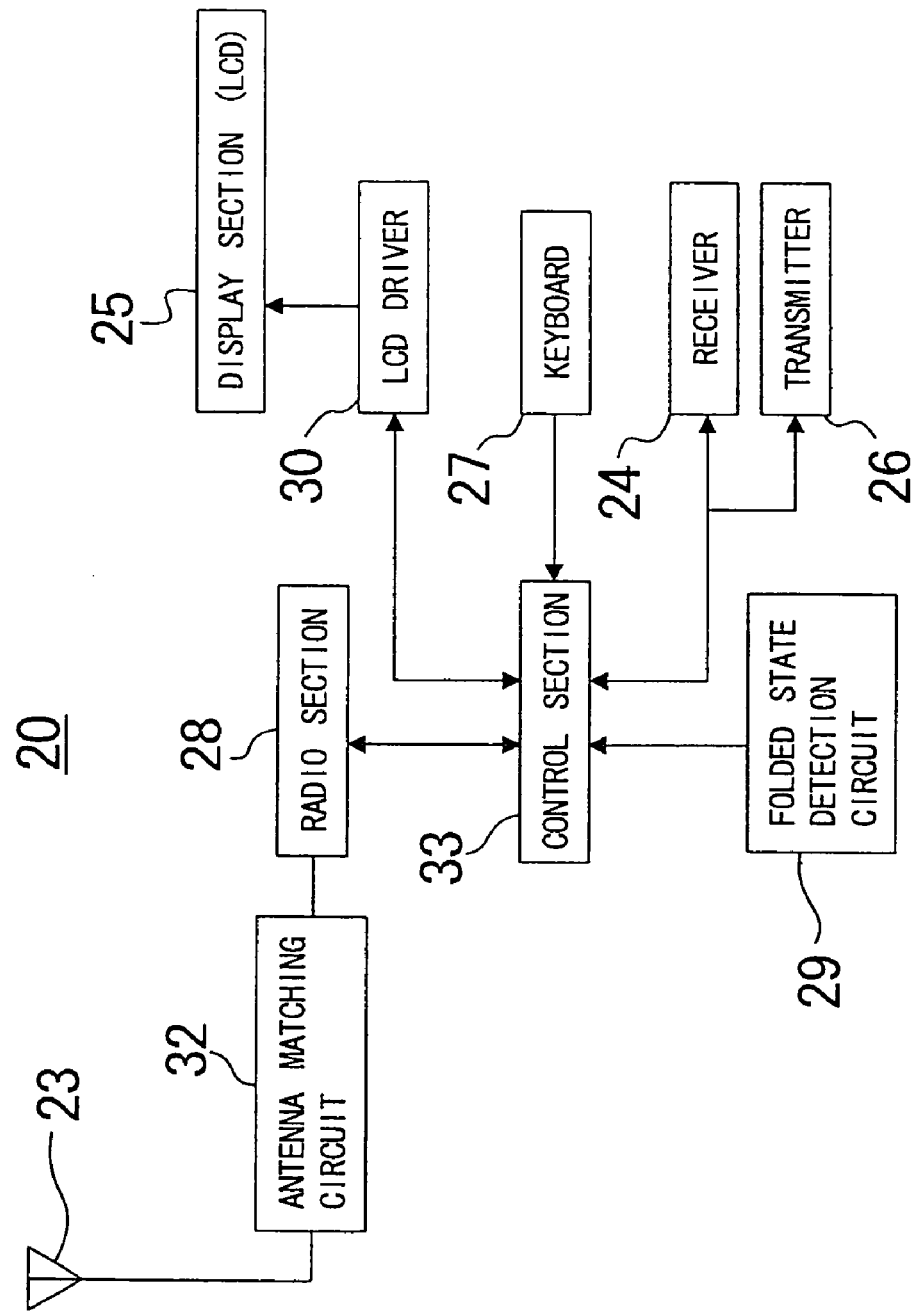
FIG. 9 is a block diagram showing an internal configuration of the foldable portable telephone set of FIG. 7.

In the foldable portable telephone set 40, the upper body 21a and the lower body 21b can be folded with each other by means of and around the hinge mechanism 22. FIG. 7 shows the foldable portable telephone set 40 in an open or unfolded state while FIG. 8 shows the foldable portable telephone set 40 in a folded state. The upper body 21a includes a receiver 24 and a display section 25 formed from an LCD apparatus. The lower body 21b includes a transmitter 26 and a keyboard 27 which is used to input a telephone number and other necessary data.

FIG. 1 is a block diagram showing a configuration of the foldable portable telephone set 40.

Referring to FIG. 1, the foldable portable telephone set 40 includes, in addition to the antenna 23, receiver 24, display section 25, transmitter 26 and keyboard 27, a radio section 28 for executing demodulation and other processes for a radio signal received through the antenna 23, a folded state detection circuit 29 for detecting whether or not the foldable portable telephone set 40 is folded and transmitting a detection signal corresponding to a result of the detection, an LCD driver 30 for driving the display section 25, an antenna matching circuit 10 for executing impedance matching between the antenna 23 and the radio section 28 to determine a characteristic of the antenna 23, a control section 33 for controlling the receiver 24, transmitter 26, radio section 28 and LCD driver 30, and a matching characteristic changeover circuit 41 for changing the characteristic of the antenna matching circuit 10 in response to a detection signal transmitted from the folded state detection circuit 29.

FIG. 2 shows an internal structure of the antenna 23, antenna matching circuit 10 and matching characteristic changeover circuit 41.

The antenna 23 includes a first capacitor C1 grounded at one end thereof, a second capacitor C2 grounded at one end thereof, and a first inductor L1 connected at the opposite ends thereof to the other end of the first capacitor C1 and the other end of the second capacitor C2.

The antenna matching circuit 10 includes a third inductor L3, and a fifth capacitor C5 grounded at one end thereof and connected at the other end thereof to the third inductor L3.

The matching characteristic changeover circuit 41 includes a third capacitor C3, a second inductor L2 connected at one end thereof to the third capacitor C3 and grounded at other end thereof, a pin diode X1 having an output terminal connected to a connecting point of the third capacitor C3 and the second inductor L2, a resistor R1 connected at one end thereof to an input terminal of the pin diode X1 and connected at the other and thereof to the control section 33, and a fourth capacitor C4 connected at one end thereof to a connecting point of the input terminal of the pin diode X1 and the resistor R1 and grounded at the other end thereof.

The capacitance value of the third capacitor C3 and the inductance value of the second inductor L2 are determined so that the antenna matching circuit 10 optimizes the antenna characteristic of the antenna 23 when the foldable portable telephone set 40 is in a folded state.

The pin diode X1, resistor R1 and fourth capacitor C4 form electric current production means for supplying cancel current which is hereinafter described to the second inductor L2.

The antenna 23, antenna matching circuit 10 and matching characteristic changeover circuit 41 are connected to one another through an antenna feeding point 11.

In the following, operation of the foldable portable telephone set 40 is described reference to FIGS. 1 and 2.

High-frequency current I1 is distributed in the upper body 21a and the lower body 21b of the foldable portable telephone set 40 with respect to the antenna 23 as seen in FIG. 2. The high-frequency current I1 varies depending upon the length of the housing (body) of the foldable portable telephone set 40. In particular, the high frequency current I1 which flows in the upper body 21a and the lower body 21b of the foldable portable telephone set 40 is different depending upon whether or not the foldable portable telephone set 40 is folded.

Therefore, in a conventional foldable portable telephone set, if an antenna which is influenced by the housing or body length is used, the characteristic of the antenna matching circuit is varied by the body length, and consequently, the antenna cannot be maintained in an optimally antenna characteristic.

In contrast, in the foldable portable telephone set 40 of the present embodiment, such a matching characteristic changeover circuit 41 as described above is provided so as to cancel the high-frequency current I1 which has an influence on the antenna characteristic of the antenna 23. Thus, cancel current I2 is supplied to the second inductor L2 of the matching characteristic changeover circuit 41 so that the high-frequency current I1 which varies when the foldable portable telephone set 40 is unfolded and which is distributed in the upper body 21a and the lower body 21b may be canceled.

The cancel current I2 is supplied in the following manner.

If the control section 33 detects based on a detection signal from the folded state detection circuit 29 that the foldable portable telephone set 40 is not in a folded state, then it applies a predetermined voltage to the resistor R1. Consequently, electric current defined by the applied voltage/resistance value of the resistor R1 flows through the resistor R1 and is inputted to the pin diode X1.

The pin diode X1 receiving the current is placed into an ON-state and supplies the cancel current I2 to the second inductor L2. The high-frequency current I1 flowing in the upper body 21a and the lower body 21b of the foldable portable telephone set 40 is cancelled by the cancel current I2.

In this manner, the foldable portable telephone set 40 can eliminate the influence of the high-frequency current I1 which varies when the foldable portable telephone set 40 is brought into an open or unfolded state.

Now, operation of the foldable portable telephone set 40 when it is used with a whip antenna of the antenna 23 accommodated therein is described with reference to FIGS. 3 and 4.

Figure 3:
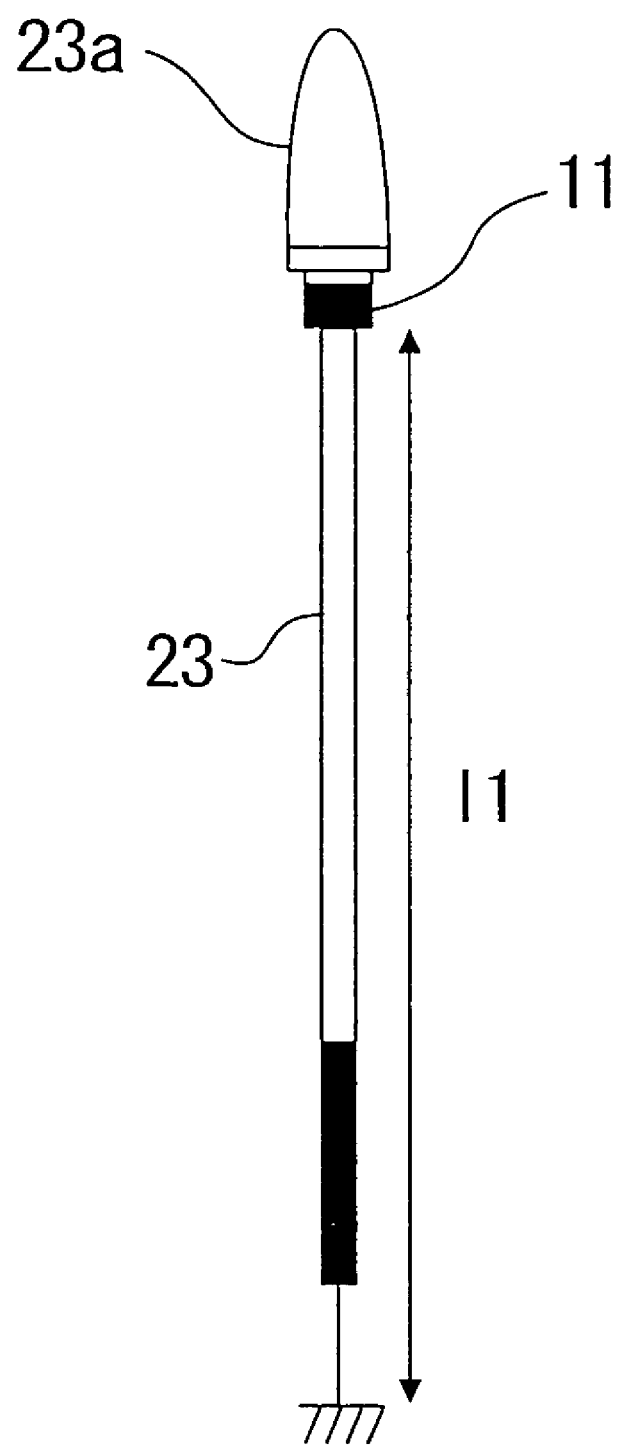
FIG. 3 is a front elevational view of an antenna of the foldable portable telephone set shown in FIG. 1 when the antenna is accommodated.

FIG. 3 particularly shows the whip antenna 23, and FIG. 4 shows the electric circuit of the foldable portable telephone set 40 when the whip antenna 23 is accommodated in the upper body 21a.

When the whip antenna 23 is accommodated in the upper body 21a as seen in FIG. 3, a helical antenna 23a at the top of the whip antenna 23 operates as an antenna. In this instance, the antenna feeding point 11 is positioned at a base portion of the helical antenna 23a, and the whip antenna 23 is in a state similar to a grounded state to the ground GND.

In this instance, the high-frequency current I1 is distributed in the whip antenna 23 and the upper body 21a and the lower body 21b of the foldable portable telephone set 40. The high-frequency current I1 varies in accordance with the housing or body length of the foldable portable telephone set 40 and has an influence on the antenna characteristic of the helical antenna 23a.

Therefore, as seen in FIG. 4, the cancel current I2 is supplied to the second inductor L2 similarly as in the matching characteristic changeover circuit 41 shown in FIG. 2.

Consequently, the high-frequency current I1 distributed in the whip antenna 23 and the upper body 21a and the lower body 21b of the foldable portable telephone set 40 is canceled. Therefore, even if the length of a housing of the foldable portable telephone set 40 varies, the high-frequency current I1 dose not have an influence on the antenna characteristic of the antenna 23. In other words, the antenna matching circuit 10 performs optimum impedance matching with the antenna 23 irrespective of whether or not the foldable portable telephone set 40 is folded. Consequently, an optimum antenna characteristic can always be maintained.

Figure 5:
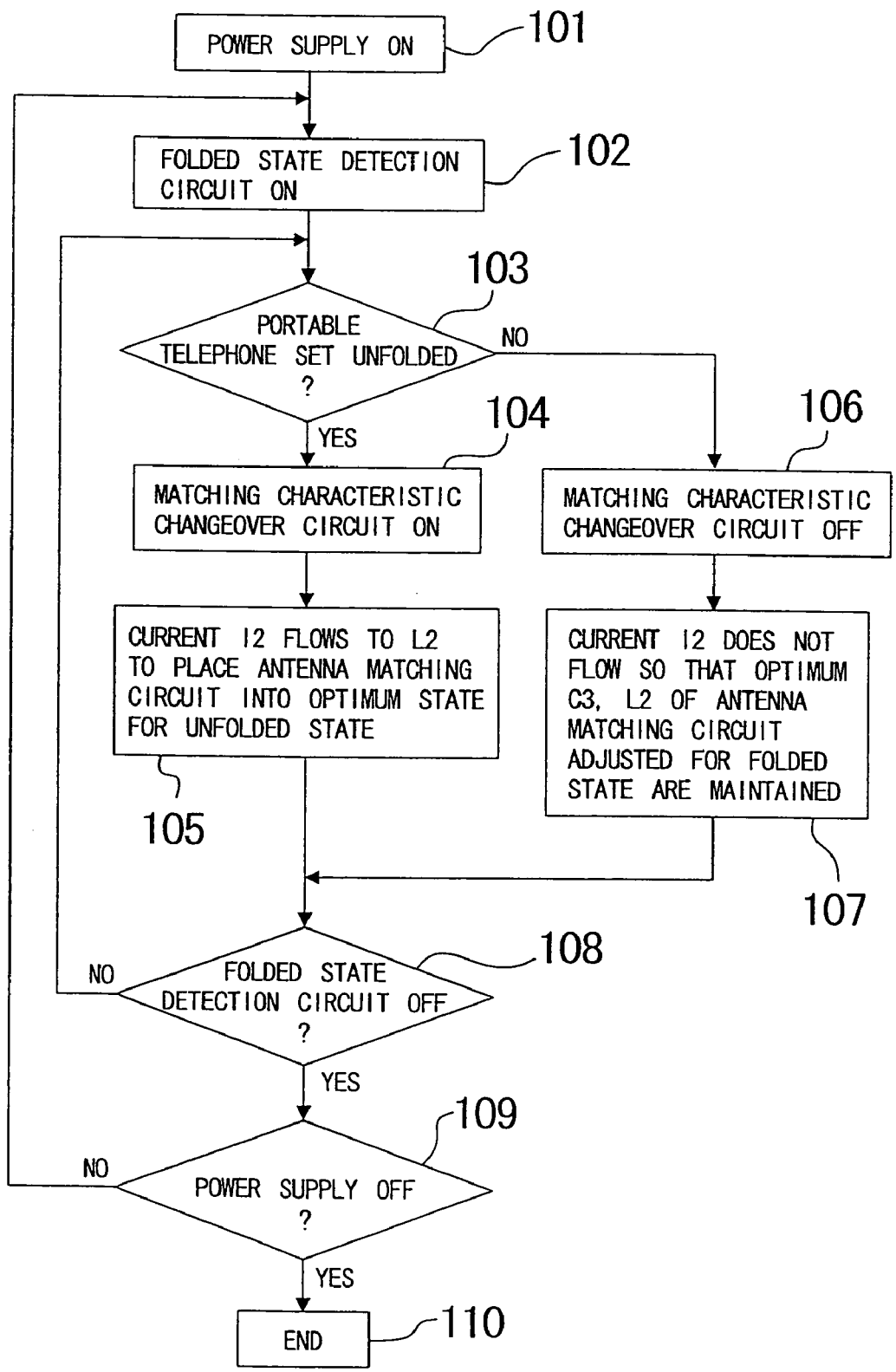
FIG. 5 is a flow chart illustrating operation of the foldable portable telephone set shown in FIG. 1.

FIG. 5 illustrates operation of the foldable portable telephone set 40. Now, operation of the foldable portable telephone set 40 is described reference to FIG. 5.

If the power supply to the foldable portable telephone set 40 is first switched on (step 101), then the folded state detection circuit 29 is turned on (step 102), and it discriminates weather or not the foldable portable telephone set 40 is open (step 103).

If the foldable portable telephone set 40 is open (YES in step 103), that is, if the foldable portable telephone set 40 is not folded, then the folded state detection circuit 29 transmits a detection signal which indicates that the foldable portable telephone set 40 is open to the control section 33.

The control section 33 received the detection signal and turns on the matching characteristic changeover circuit 41

(step 104), that is, applies a predetermined voltage to the resistor R1 to supply the cancel current I2 to the second inductor L2 of the matching characteristic changeover circuit 41. The cancel current I2 cancels the high-frequency current I1 distributed in the upper body 21a and the lower body 21b of the foldable portable telephone set 40.

Consequently, the characteristic of the antenna matching circuit 10 is optimized, and an optimum antenna characteristic of the antenna 23 is achieved (step 105).

On the other hand, if the foldable portable telephone set 40 is closed or folded (NO in step 103), then the folded state detection circuit 29 transmits a detection signal which indicates that the foldable portable telephone set 40 is closed to the control section 33.

The control section 33 receives the detection signal and renders or keeps the matching characteristic changeover circuit 41 inoperative (step 106). In particular, the control section 33 does not apply the predetermined voltage to the resistor R1. Consequently, the cancel current I2 is not supplied to the second inductor L2 of the matching characteristic changeover circuit 41 (step 107).

Since the capacitance value of the third capacitor C3 and the inductance value of the second inductor L2 are determined so that the characteristic of the antenna matching circuit 10 may be optimum when the foldable portable telephone set 40 is in a folded state, the matching characteristic of the antenna matching circuit 10 is maintained in an optimum state when the cancel current I2 is not supplied to the second inductor L2. In other words, optimization of the antenna characteristic of the antenna 23 is achieved.

It is normally discriminated whether or not the folded state detection circuit 29 is in an OFF state (step 108).

If the folded state detection circuit 29 is in an ON-state (NO in step 108), then the processing in steps 103 to 107 is repeated. On the other hand, if the folded state detection circuit 29 is in an OFF-state (YES in step 108), then it is discriminated whether or not the power supply to the foldable portable telephone set 40 is in an OFF-state (step 109).

If the power supply is in an ON-state (NO in step 109), then the processing in steps 103 to 108 described above is repeated. On the other hand, if the power supply is in an OFF-state (YES in step 109), then the processing is ended (step 110).

In the embodiment described above, the capacitance value of the third capacitor C3 and the inductance value of the second inductor L2 are determined so that the antenna characteristic by the antenna matching circuit 10 may be optimum when the foldable portable telephone set 40 is in a folded state. However, it is otherwise possible to determine the capacitance value of the third capacitor C3 and the inductance value of the second inductor L2 so that the characteristic of the antenna matching circuit 10 may be optimum conversely when the foldable portable telephone set 40 is in an unfolded state.

Figure 6:
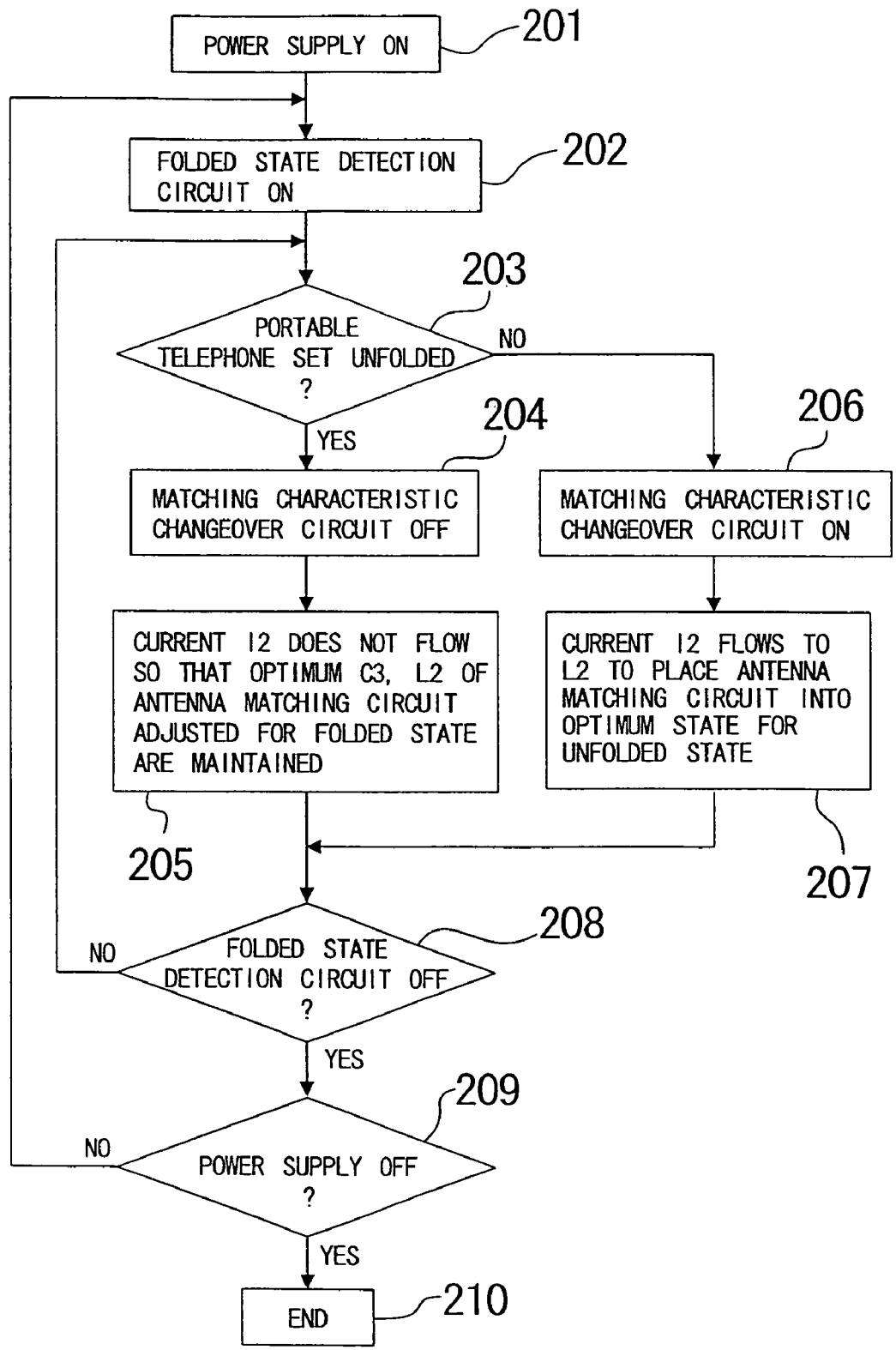
FIG. 6 is a flow chart illustrating different operation of the foldable portable telephone set shown in FIG. 1.

Operation of the foldable portable telephone set 40 when the capacitance value of the third capacitor C3 and the inductance value of the second inductor L2 are determined in the manner just described is illustrated in FIG. 6.

Referring to FIG. 6, if the power supply to the foldable portable telephone set 40 is turned ON first (step 201), then the folded state detection circuit 29 is turned ON (step 202), and it is discriminated whether or not the foldable portable telephone set 40 is in an open state (step 203).

If the foldable portable telephone set 40 is in an open state, that is, if the foldable portable telephone set 40 is not unfolded (YES in step 203), then the folded state detection circuit 29 transmits a detection signal indicating that the foldable portable telephone set 40 is in an open state to the control section 33.

The control section 33 receives the detection signal and renders or keeps the matching characteristic changeover circuit 41 inoperative (step 204). In other words, the predetermined voltage is not applied to the resistor R1. Accordingly, the cancel current I2 is not supplied to the second inductor L2 of the matching characteristic changeover circuit 41 either (step 205).

Since the capacitance value of the third capacitor C3 and the inductance value of the second inductor L2 are determined so that the characteristic of the antenna matching circuit 10 may be optimum conversely when the foldable portable telephone set 40 is in an unfolded state, the matching characteristic of the antenna matching circuit 10 is maintained in an optimum state when the cancel current I2 is not supplied to the second inductor L2. In other words, optimization of the antenna characteristic of the antenna 23 is achieved.

On the other hand, if the foldable portable telephone set 40 is in a closed state in step 203, that is, if the foldable portable telephone set 40 is folded (NO in step 203), then the folded state detection circuit 29 transmits a detection signal indicating that the foldable portable telephone set 40 is in a closed state to the control section 33.

The control section 33 receives the detection signal and turns ON the matching characteristic changeover circuit 41 (step 206). In particular, the predetermined voltage is applied to the resistor R1 to supply the cancel current I2 to the second inductor L2 of the matching characteristic changeover circuit 41. The cancel current I2 cancels the high frequency current I1 distributed in the upper body 21a and the lower body 21b of the foldable portable terminal set 40.

Consequently, the matching characteristic of the antenna matching circuit 10 is optimized, and therefore, optimization of the antenna characteristic of the antenna 23 is achieved (step 207).

It is normally discriminated whether or not the folded state detection circuit 29 is in an OFF-state (step 208).

If the folded state detection circuit 29 is in an ON-state (NO in step 208), then the processing in steps 203 to 207 described above is repeated. On the other hand, if the folded state detection circuit 29 is in an OFF-state (YES in step 208), then it is discriminated whether or not the power supply to the foldable portable telephone set 40 is in an OFF-state (step 209).

If the power supply is in an ON-state (NO in step 209), the processing in steps 203 to 208 described above is repeated. On the other hand, if the power supply is in an OFF-state (YES in step 209), then the processing is ended (step 210).

While a preferred embodiment of the present invention has been described using specific terms, such description is for illustrative purpose only, and it is to be understood that changes and variations may be made without departing from the spirit or scope of the following claims.

What is claimed is:

1. A foldable portable radio terminal, comprising:
    a portable radio terminal body including a first body and
        a second body connected for pivotal folding movement
        to each other;
    an antenna mounted on said first body;
    an antenna matching circuit for determining an antenna
        characteristic of said antenna;
    a matching characteristic changeover circuit for changing
        over the characteristic of said antenna matching circuit
        so that the antenna characteristic when said portable radio terminal body is folded and the antenna characteristic when said portable radio terminal body is not folded are equal to each other;

a folded state detection circuit for detecting whether or not said portable radio terminal body is folded and issuing a detection signal representative of a result of the detection, wherein said matching characteristic changeover circuit changes over the characteristic of said antenna matching circuit in response to the detection signal of said folded state detection circuit;

said antenna matching circuit determines the antenna characteristic in a state wherein said portable radio terminal body is folded, said matching characteristic changeover circuit changes over the characteristic of said antenna matching circuit so that the antenna characteristic of said antenna matching circuit when said portable radio terminal body is not folded may be equal to the antenna characteristic in the state wherein said portable radio terminal body is folded, and said matching characteristic changeover circuit is connected to said antenna and supplies current so as to cancel high frequency current distributed in said portable radio terminal body in order to eliminate variation of the high frequency current between when said portable radio terminal body is folded and when said portable radio terminal body is not folded.

2. A foldable portable radio terminal as claimed in claim 1, wherein said matching characteristic changeover circuit includes:

a first capacitor connected to an antenna feeding point;

an inductor connected at an end thereof to said first capacitor and grounded at the other end thereof; and current production means for supplying current to said inductor.

3. A foldable portable radio terminal as claimed in claim 2, wherein said current production means includes a diode for supplying current to a connection point between said first capacitor and said inductor, and a resistor connected in series to said diode.

4. A foldable portable radio terminal as claimed in claim 3, wherein said current production means further includes a second capacitor connected at an end thereof to a connection point between said diode and said resistor and grounded at the other end thereof.

5. A foldable portable radio terminal as claimed in claim 2, wherein the capacitance value of said first capacitor and the inductance value of said inductor are determined so that said antenna matching circuit exhibits an optimum antenna characteristic when said portable radio terminal body is folded.

6. A foldable portable radio terminal as claimed in claim 3, wherein said current production means applies a voltage to said resistor to turn on said diode to supply current to said inductor when said folded state detection circuit detects that said portable radio terminal body is not folded.

7. A foldable portable radio terminal as claimed in claim 2, wherein said antenna includes a helical antenna having an antenna feeding point at a base portion thereof.

8. A foldable portable radio terminal as claimed in claim 7, wherein said helical antenna is provided at a tip end of a whip antenna mounted for telescopic movement into and out of said portable radio terminal body, and the base portion of said helical antenna serves as the antenna feeding point when said whip antenna is accommodated in said portable radio terminal body.

9. A foldable portable radio terminal comprising:

a portable radio terminal body including a first body and a second body connected for pivotal folding movement to each other;

an antenna mounted on said first body;

an antenna matching circuit for determining an antenna characteristic of said antenna;

a matching characteristic changeover circuit for changing over the characteristic of said antenna matching circuit so that the antenna characteristic when said portable radio terminal body is folded and the antenna characteristic when said portable radio terminal body is not folded are equal to each other; and a folded state detection circuit for detecting whether or not said portable radio terminal body is folded and issuing a detection signal representative of a result of the detection, wherein said matching characteristic changeover circuit changes over the characteristic of said antenna matching circuit in response to the detection signal of said folded state detection circuit, said antenna matching circuit determines the antenna characteristic in a state wherein said portable radio terminal body is not folded, and said matching characteristic changeover circuit changes over the characteristic of said antenna matching circuit so that the characteristic of said antenna matching circuit when said portable radio terminal body is folded may be equal to the antenna characteristic in the state wherein said portable radio terminal body is not folded, and said matching characteristic changeover circuit is connected to said antenna and supplies current so as to cancel high frequency current distributed in said portable radio terminal body in order to eliminate variation of the high frequency current between when said portable radio terminal body is not folded and when said portable radio terminal body is folded.

10. A foldable portable radio terminal as claimed in claim 9, wherein said matching characteristic changeover circuit includes:

a first capacitor connected to an antenna feeding point;

an inductor connected at an end thereof to said first capacitor and grounded at the other end thereof; and current production means for supplying current to said inductor.

11. A foldable portable radio terminal as claimed in claim 10, wherein said current production means includes a diode for supplying current to a connection point between said first capacitor and said inductor, and a resistor connected in series to said diode.

12. A foldable portable radio terminal as claimed in claim 11, wherein said current production means further includes a second capacitor connected at an end thereof to a connection point between said diode and said resistor and grounded at the other end thereof.

13. A foldable portable radio terminal as claimed in claim 10, wherein the capacitance value of said first capacitor and the inductance value of said inductor are determined so that said antenna matching circuit exhibits an optimum antenna characteristic when said portable radio terminal body is not folded.

14. A foldable portable radio terminal as claimed in claim 11, wherein said current production means applies a voltage to said resistor to turn on said diode to supply current to said inductor when said folded state detection circuit detects that said portable radio terminal body is folded.

15. A foldable portable radio terminal as claimed in claim 10, wherein said antenna includes a helical antenna having an antenna feeding point at a base portion thereof.

16. A foldable portable radio terminal as claimed in claim 15, wherein said helical antenna is provided at a tip end of a whip antenna mounted for telescopic movement into and out of said portable radio terminal body, and the base portion of said helical antenna serves as the antenna feeding point when said whip antenna is accommodated in said portable radio terminal body.

* * * * *